(12) United States Patent
Mora

(10) Patent No.: US 9,567,096 B2
(45) Date of Patent: Feb. 14, 2017

(54) EMERGENCY POWER SUPPLY DEVICE FOR AN AIRCRAFT AND AIRCRAFT PROVIDED WITH SUCH A DEVICE

(71) Applicant: SAFRAN ELECTRICAL & POWER, Blagnac (FR)

(72) Inventor: Jerome Mora, Charenton-le-Pont (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 14/416,178

(22) PCT Filed: Jul. 11, 2013

(86) PCT No.: PCT/FR2013/051669
§ 371 (c)(1),
(2) Date: Jan. 21, 2015

(87) PCT Pub. No.: WO2014/016492
PCT Pub. Date: Jan. 30, 2014

(65) Prior Publication Data
US 2015/0239571 A1     Aug. 27, 2015

(30) Foreign Application Priority Data
Jul. 23, 2012  (FR) ..................................... 12 57113

(51) Int. Cl.
*B64D 33/10* (2006.01)
*B64D 41/00* (2006.01)
*F03B 15/16* (2006.01)
*H02K 7/18* (2006.01)

(52) U.S. Cl.
CPC ............. *B64D 41/007* (2013.01); *F03B 15/16* (2013.01); *H02K 7/1823* (2013.01); *Y02T 50/44* (2013.01)

(58) Field of Classification Search
CPC ....... B64D 41/00; B64D 41/007; B64D 33/02; F03B 15/16
USPC ............................................. 244/44, 53 R, 58
See application file for complete search history.

(56) References Cited

U.S. PATENT DOCUMENTS

| 6,127,758 A | 10/2000 | Murry et al. |
| 6,776,002 B1 | 8/2004 | Ho |
| 8,192,158 B1 | 6/2012 | Tews et al. |
| 8,276,392 B2 * | 10/2012 | Van Der Woude .... B64D 33/10 244/57 |
| 2011/0067393 A1 * | 3/2011 | Chase ..................... F16D 31/02 60/484 |

(Continued)

FOREIGN PATENT DOCUMENTS

DE     10 32 033     6/1958

OTHER PUBLICATIONS

International Search Report Issued Nov. 7, 2013 in PCT/FR13/051669 Filed Jul. 11, 2013.

*Primary Examiner* — Richard G Davis
(74) *Attorney, Agent, or Firm* — Oblon, McClelland, Maier & Neustadt, L.L.P.

(57) ABSTRACT

An emergency power supply device for aircraft, including at least one air intake duct configured to receive a relative airflow during a flight of the aircraft, a turbine arranged in the duct, to be driven by the relative airflow, and at least one device for generating power for the aircraft, the turbine being connected to the power-generating device to produce power for the aircraft at least under flight conditions thereof.

9 Claims, 1 Drawing Sheet

(56) References Cited

U.S. PATENT DOCUMENTS

2012/0006938 A1\* 1/2012 Gatzke ................ B64D 41/007
　　　　　　　　　　　　　　　　　　　　　244/58

\* cited by examiner

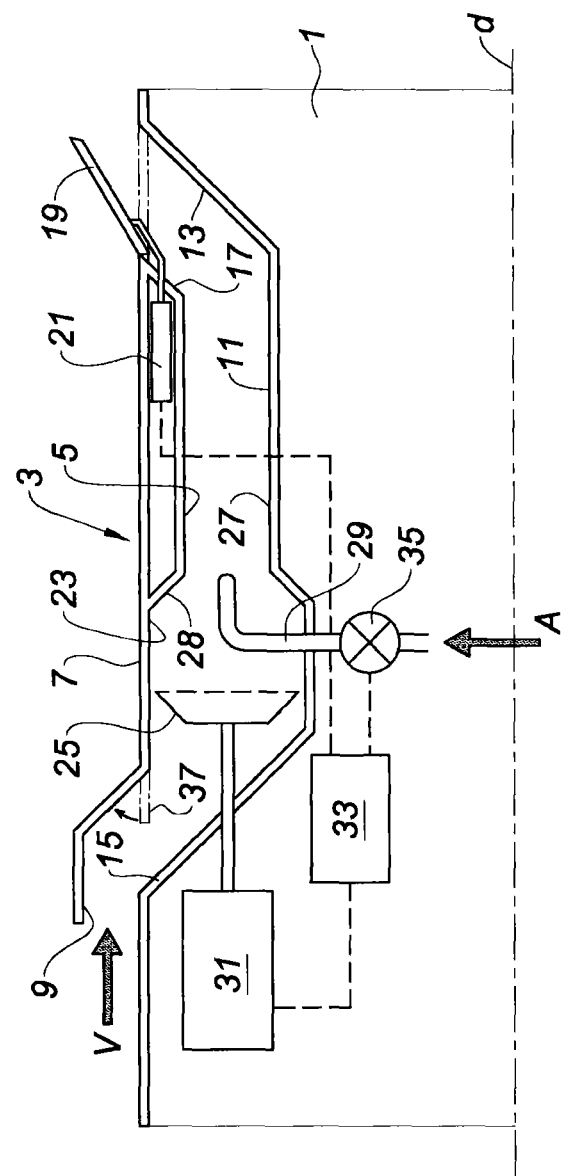

EMERGENCY POWER SUPPLY DEVICE FOR AN AIRCRAFT AND AIRCRAFT PROVIDED WITH SUCH A DEVICE

The invention relates to an emergency power supply device for aircraft and an aircraft provided with such a device.

It is generally known that controlling an aircraft, notably an aircraft of a certain size, cannot be achieved in an ultimate emergency in an entirely mechanical manner, and that it requires a power source independent of the main power system. This source must, autonomously and without any time limit, deliver sufficient power to ensure control of the aircraft and a safe landing of the latter.

On present aircraft, a system with an auxiliary propeller, called RAT (Ram Air Turbine) is generally used as an ultimate emergency power source. This system delivers hydraulic or electrical power or a combination of these two powers enabling the critical systems of the aircraft to be supplied with energy.

However, a RAT system is relatively heavy and must be deployed to be put into operation. Furthermore, not being used except in the event of a failure, it is difficult to test and can present latent failures (not immediately visible).

The invention focuses on providing an emergency power supply device for aircraft that does not require the deployment of a mechanical system and that provides a significant weight saving on the aircraft.

An emergency power supply device is proposed for aircraft, characterized in that it comprises at least one air intake duct designed to receive a relative airflow during the flight of the aircraft, a turbine arranged in said duct, to be driven by the relative airflow, and at least one device for generating power for the aircraft, said turbine being connected to said power-generating device in order to produce power for the aircraft at least under flight conditions thereof.

By relative airflow, we mean the aerodynamic flow created by the aircraft's own speed.

The result of this arrangement is an emergency power supply device for aircraft that functions autonomously and independently of the main power supply system of the aircraft, in flight, and that can be installed on an aircraft without necessitating the deployment of a mechanical system such as a RAT system comprising a rigid and heavy transmission device.

Said turbine and/or said generator is/are advantageously connected to or associated with at least one auxiliary drive device of the former and/or the latter in order to produce power for the aircraft in all the operating situations of the latter (aircraft in flight or on the ground).

The auxiliary drive device is advantageously a device with a venturi tube supplied by a source of air, preferably coming from the aircraft, and arranged or formed in the air intake duct in order to drive said turbine.

This auxiliary drive device is capable of being coupled to said turbine in order to drive it, or to be uncoupled from it.

The auxiliary drive device can thus be coupled to said turbine in a condition of the aircraft on the ground, when the turbine cannot be driven by the relative airflow. The auxiliary drive device can furthermore be uncoupled from the turbine in a condition of the aircraft during flight where the relative airflow is sufficient to drive the turbine at a sufficient speed to provide the required power, but it can also be coupled to the turbine in flight in order to increase the driving speed of the latter and to supply more power to the aircraft.

Said duct advantageously includes at least one air inlet and/or air outlet flap, mobile in an adjustable manner, between a closed and an open, preferably fully closed and open, position, this flap allowing the speed of said turbine to be adjusted for the required power.

Said air intake duct preferably includes a single flap, either an air inlet flap or an air outlet flap.

Said emergency power supply device advantageously includes a control unit, connected to said power-generating device for the aircraft, to said auxiliary drive device and to said air inlet and/or air outlet flap, and capable of controlling the device as an automatic control of a required power, namely to move, in an adjustable manner, the air inlet and/or air outlet flap and to perform the coupling/uncoupling of the auxiliary drive device to/from the turbine.

An aircraft is also proposed, provided with an emergency power supply device as defined above.

The power-generating device is advantageously a generator of electrical power of the aircraft, and in particular one of the main generators of the aircraft, which is therefore also used as an emergency electrical power source for the aircraft.

Said auxiliary drive device can be an electric motor of the aircraft, a propulsion engine of the aircraft, or the APU device (auxiliary power unit) of the aircraft.

Said generator is then driven in nominal mode by one of the main power sources of the aircraft (aircraft motors/engines, APU system), and in emergency mode, it is driven in an independent manner by said turbine of the air intake duct, the turbine being activated by a relative airflow or aerodynamic flow created by the aircraft's own speed. This configuration limits the risk of latent failure of a totally independent emergency device, rarely used or tested.

The auxiliary drive device is advantageously a venturi tube device supplied by a source of air of the aircraft, and arranged or formed in the air intake duct in order to drive said turbine, the air source being, for example, the air bleed device or the air conditioning device of the aircraft.

The air intake duct is advantageously formed as a device with a venturi tube arranged downstream of the turbine relative to the flow of aerodynamic air.

This device with a venturi tube is capable of being controlled during operation by said control unit, mainly in a condition of the aircraft on the ground, but as mentioned above, it can also be put into operation during flight in order to increase the speed of the turbine and hence the power generated.

The air intake duct advantageously includes an inlet formed in the body of the aircraft fuselage, a main part formed in the body of the aircraft fuselage and an outlet formed in the body of the aircraft fuselage, said inlet and/or said outlet being provided with an air outlet flap opening out on the surface of the body of the fuselage.

This arrangement limits the aerodynamic drag specific to the device, since the main part of the air intake duct is inside the body of the aircraft fuselage.

Furthermore, the inlet of the air intake duct can be coupled to an air intake system of the aircraft, such as the air conditioning system of the aircraft.

The invention also relates to a new utilization of an electrical power generator for an aircraft, in particular, one of the main generators of the aircraft, as a source of emergency electrical power for the aircraft, said generator being capable of being driven by means of at least one turbine arranged in an air intake duct of the aircraft in order to be driven by the relative airflow of the flight of the aircraft, and in particular by means of an emergency power supply device such as defined above.

An embodiment example of the invention is presently described with reference to the attached drawing, in which:

FIG. 1 is a sectional diagram of an aircraft provided with an emergency power supply device according to an embodiment of the invention.

Identical reference marks used in the figures refer to identical or technically equivalent parts.

The terms "higher", "medium" and "lower" refer to relative positions in standard utilization or assembly modes.

The terms "longitudinal" and "transversal" qualify parts extending respectively in a given direction and on a plane perpendicular to that direction.

With reference to FIG. 1, an aircraft 1 including an emergency power supply device 3 as shown, includes an air intake duct 5 arranged along the body of the aircraft fuselage 7, perceptibly on the longitudinal axis d of the aircraft. This air intake duct 5 is capable of capturing through its inlet 9 an aerodynamic flow or the relative airflow V during the flight of the aircraft.

The duct 5 includes a forward inlet 9 (on the left of the drawing) formed in the body of the aircraft fuselage 7, a main part 11 formed in the body of the aircraft fuselage 7 and communicating with the inlet 9, and an outlet 13 arranged at the rear of the main part 11 and communicating with the latter.

The inlet 9 includes a tubular part 15 turned toward the interior of the body of the aircraft fuselage 7.

The outlet 13 includes a tubular part 17 turned toward the exterior of the body of the aircraft fuselage 7, and opening out on the surface of the body of the aircraft fuselage 7. This outlet 13 includes an air outlet flap 19, mobile in an adjustable manner through an actuator 21 (of the jack type, for example) between a closed position (dot and dash line) tangential to the body of the aircraft fuselage 7 and an open position projecting from the body of the aircraft fuselage (as shown).

The main part 11 of the air intake duct includes a forward flared part 23 in which a turbine 25 is arranged, and an aft tubular part 27 with a reduced cross section, parallel to the longitudinal axis d of the aircraft and forming a venturi tube 28 in the duct.

The air intake duct here is arranged parallel to the longitudinal axis of the aircraft, but it could also be transversal to the longitudinal axis of the aircraft.

An air ejection duct 29, connected to an air source A of the aircraft, such as the air intake system or the air conditioning system of the aircraft (not shown), is arranged aft of the turbine 25 and in the flared part 23 of the duct. This air ejection duct 29 is intended to form an air current capable of driving the turbine 25 in cooperation with the venturi tube 28.

The turbine 25, arranged coaxially to the axis d of the body of the aircraft fuselage, is connected to an electrical power generator 31 of the aircraft, in particular one of the main generators of the aircraft.

The generator 31 can also be connected, by means of a coupling device (not shown), for example of the freewheel type, to a main power source of the aircraft, such as a motor/engine or the APU device of the aircraft (not shown), being driven by this motor/engine when the relative airflow is non-existent or insufficient.

The action of coupling the turbine to the generator enables a permanent check, through the achieved production of power, that the turbine is functioning. This remedies the problem of a turbine failure or a latent failure of the device if the device was only utilized in emergency situations, and therefore rarely.

The generator 31 is therefore driven by said turbine 25 of the air intake duct, the turbine being activated by the relative airflow or aerodynamic flow V created by the aircraft's own speed in flight.

A control unit 33, connected to the control panel of the aircraft (not shown), to the power generator 31, to a supply valve 35 of the air ejection duct 29, to the actuator 21 of the air outlet flap 19 and possibly to said coupling device, controls the emergency power supply device 3. This control unit 33 controls the device 3 as an automatic control of a power required by the aircraft, corresponding to a given situation of the aircraft, notably an emergency situation of the aircraft. This control unit 33 therefore initiates the movement of the air outlet flap 19 and the actuation of the valve 35 of the air ejection duct 29 in order to drive the turbine 25 at a speed corresponding to a power of the generator 31 required for the aircraft, and notably in the event of an emergency situation.

The functioning of the device 3 is presently described. It results from the preceding description.

We consider an emergency situation in flight. This situation is called up when a failure is detected in the main power supply device of the aircraft. A switching of the electrical power supply of the aircraft to the emergency mode, with generation of an alarm, is performed automatically by a power management device (not shown) of the aircraft, which detects the failure of the main power supply device of the aircraft.

In the emergency situation in flight of the aircraft, the relative airflow V of the flight of the aircraft drives the turbine 25 and therefore the associated generator 31 in order to produce emergency power for the aircraft. If this produced power is not sufficient, the control unit 33 can open the valve 35 of the air ejection duct according to the source of air A in order to increase the speed of the turbine 25 and therefore the power produced by the generator 31.

It should be noted that, in normal functioning of the aircraft, the device produces electrical power, in flight, through the turbine being driven by the relative airflow, and on the ground, through the turbine being driven by the operation of the venturi tube device.

Embodiment variants exist within the framework of the invention.

Thus, in the sprit of the invention, the emergency power supply device for aircraft comprises at least one air intake duct 5, designed to receive a relative airflow V during the flight of the aircraft, and a turbine 25 arranged in said duct, to be driven by the relative airflow, said turbine being connected to at least one device 31 for generating power for the aircraft in order to produce power for the aircraft at least under flight conditions thereof.

The generator driven by the turbine 25 may or may not be part of the emergency power supply device 3, and likewise the auxiliary drive device 28, 29 of the turbine, such that the device 3 could be delivered and installed on the aircraft as an independent unit.

An air inlet flap 37, in dot and dash line, whose actuator is not shown, could also be installed at the inlet 9 of the air intake duct, this flap being able to be opened by the control unit from a position tangential to the fuselage toward the exterior, according to the arrow, in order to favor the capture of air in the air intake duct. The control of the device can then be performed by the inlet flap and/or the outlet flap.

The inlet to the air intake duct could also be coupled to the air conditioning system of the aircraft or to another air intake system of the aircraft.

Another possibility, already mentioned, would be to connect the generator mechanically to the APU device or to a motor/engine, through a freewheel, which would allow the generator to be driven by the motor/engine in normal mode and to leave it to be driven by the turbine in the event of a failure.

It is also possible to envisage other shapes for the air intake duct.

The invention claimed is:

1. An emergency power supply device for aircraft, comprising:
   at least one air intake duct configured to receive airflow during a flight of the aircraft;
   a turbine arranged in the duct, to be driven by the relative airflow; and
   at least one generator for generating power for the aircraft, the turbine being connected to the power-generating device to produce power for the aircraft at least under flight conditions thereof;
   wherein the turbine and/or the generator is/are connected to or associated with at least one auxiliary drive device of the turbine and/or the generator, the auxiliary drive device being a device with a venturi tube supplied by a source of air, and arranged or formed in the air intake duct to drive the turbine.

2. The emergency power supply device for aircraft as claimed in claim 1, wherein the auxiliary drive device is configured to be coupled to the turbine to drive the turbine, or to be uncoupled from the turbine.

3. The emergency power supply device for aircraft as claimed in claim 1, wherein the air intake duct includes at least one air inlet and/or air outlet flap, mobile in an adjustable manner, between a closed and an open position.

4. The emergency power supply device for aircraft as claimed in claim 3, further comprising a control unit connected to the power-generating device for the aircraft, to the auxiliary drive device, and to the air inlet and/or air outlet flap, and configured to control the device as an automatic control of a required power.

5. The emergency power supply device for aircraft as claimed in claim 1, wherein the auxiliary drive device is a venturi tube device supplied by a source of air of the aircraft, and arranged or formed in the air intake duct to drive the turbine.

6. An aircraft provided with an emergency power supply device as claimed in claim 1, wherein the generator is a generator of electrical power of the aircraft.

7. The aircraft as claimed in claim 6, wherein the air intake duct includes an inlet formed in a body of the aircraft fuselage, a main part formed in the body of the aircraft fuselage, and an outlet formed in the body of the fuselage, the inlet and/or the outlet including an air outlet flap and opening out on a surface of the body of the fuselage.

8. The aircraft as claimed in claim 6, wherein the generator is connected through a freewheel to an APU device of the aircraft to allow the generator to be driven by the APU device in normal mode and to leave it to be driven by the turbine in the event of a failure of said APU device, or connected to a motor/engine, to allow the generator to be driven by the motor/engine in a normal mode and to leave the generator to be driven by the turbine in event of a failure of said engine.

9. A utilization of an electrical power generator for an aircraft as a source of emergency electrical power for the aircraft, the generator configured to be driven by at least one turbine arranged in an air intake duct of the aircraft to be driven by relative airflow of the flight of the aircraft,
   wherein the turbine and/or the generator is/are connected or associated with at least one auxiliary drive device of the turbine and/or the generator,
   the auxiliary drive device being a device with a venturi tube supplied by a source of air, and arranged or formed in the air intake duct to drive the turbine.

* * * * *

UNITED STATES PATENT AND TRADEMARK OFFICE
CERTIFICATE OF CORRECTION

PATENT NO. : 9,567,096 B2  
APPLICATION NO. : 14/416178  
DATED : February 14, 2017  
INVENTOR(S) : Jerome Mora Page 1 of 1

It is certified that error appears in the above-identified patent and that said Letters Patent is hereby corrected as shown below:

In Column 5, Line 15 (Claim 1), insert --a relative-- before "airflow"

Signed and Sealed this  
Tenth Day of April, 2018

Andrei Iancu  
*Director of the United States Patent and Trademark Office*